Patented Aug. 23, 1949

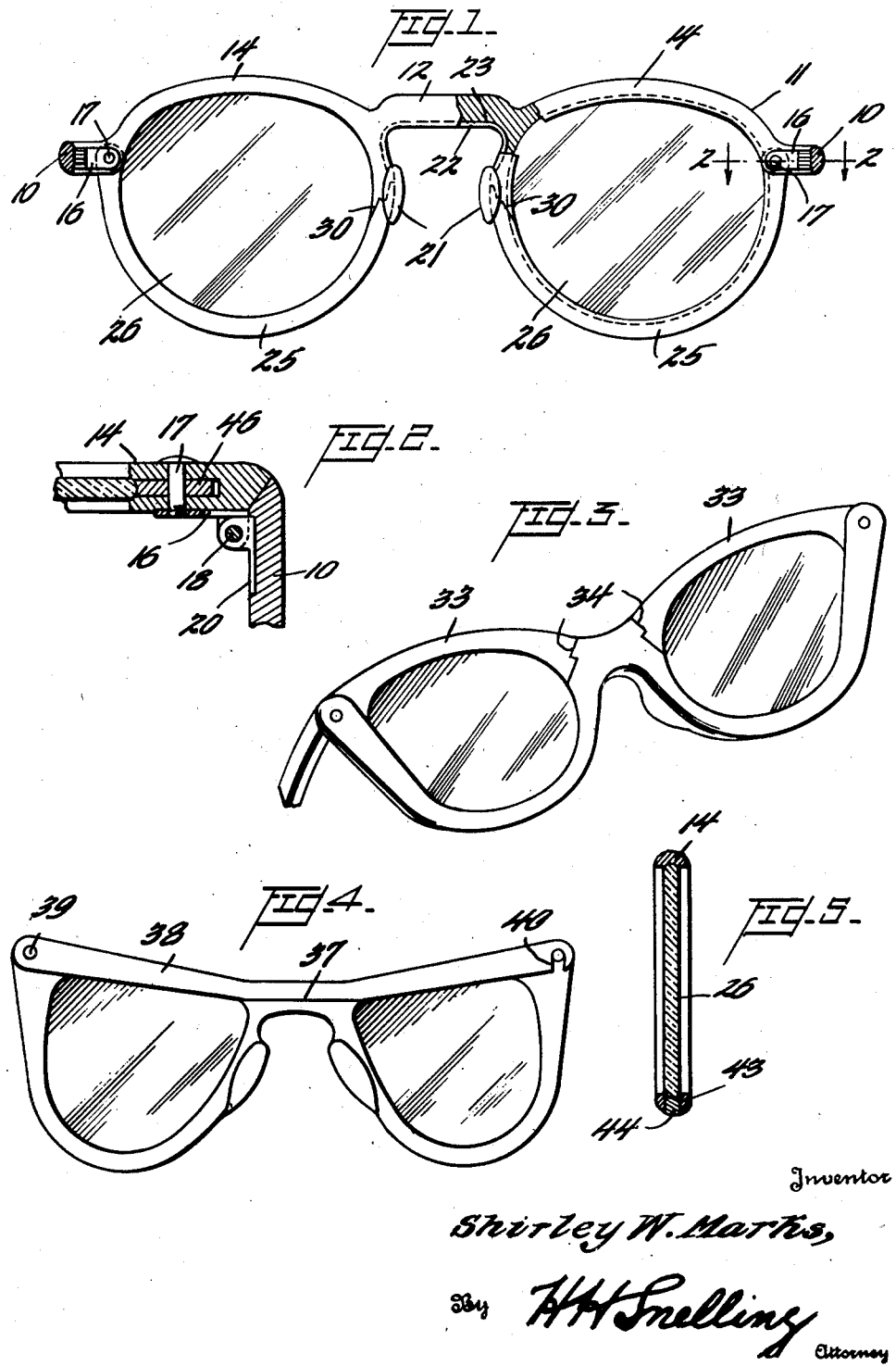

2,479,754

UNITED STATES PATENT OFFICE 2,479,754

RELEASABLE LENS HOLDING MEANS FOR HARMONIZING EYEGLASS FRAMES

Shirley W. Marks, New York, N. Y.

Application June 11, 1946, Serial No. 675,912

3 Claims. (Cl. 88—47)

This invention relates to eyeglasses or ophthalmic mountings and has for its principal object the provision of a plurality of frames all for use with a single pair of lenses which can be inserted into any one of the mountings of which each is of a different color so as to harmonize with a particular costume. An important object of the invention is to provide a pair of eyeglasses in which the frame fronts each consist of at least three pieces and at least one and preferably two of these are hingedly secured to the major portion of the frame front in order to permit ready insertion and removal of the lenses.

An incidental object of the invention is the provision of a pair of eyeglasses to hold perfectly flat panes of glass to be used as goggles, particularly to cases where damage or breaking of a glass is rather common, as for example in factory work.

A further object of the invention is the provision of a temple-frame hinge in which the stud serves as a pivot for the swinging portion of the frame front, particularly when such a pivot is associated with a very simple locking device, consisting merely of a spring joining the two guards. By the use of the mountings of this invention a lady can readily remove her two lenses from one frame and insert them in another mounting in a minimum of time merely by pressing together the two guards and then moving the hinged portions which releases entirely the lenses, preferably one at a time.

As these lenses fit snugly into grooves in the frame front as is quite customary and the lenses are rarely circular an exact orientation of the lens is had without any effort at all on the part of the wearer. In the rare case of lenses with a circular outline and having cylindrical corrections, the lenses may bear an inconspicuous marking for easy positioning.

In the drawings:

Figure 1 is a rear view of a rather conventional type of eyeglass.

Figure 2 is a detailed view showing the hinge and pivot.

Figures 3 and 4 are modifications.

Figure 5 shows a slotted entry for industrial or plane glasses.

In Figure 1 the two temples 10 are broken away for clarity and are of the normal type to match the rest of the mounting. The frame front which may be of any material, transparent or opaque, is denoted as a whole by the numeral 11, and has a bridge 12 integral with the top portions 14 of the frame front. The frame front carries the metal hinge base 16 which has a stud 17 through the top portion 14. A hinge screw 18 serves as pivot for the metal temple portion 20 of the hinge secured as usual to the temple 10. While in some modifications the two guards 21 may be integral with the frame portions 11, in Figure 1 the two guards are joined together by a spring 22 which fits in a groove 23 in the bottom of the bridge.

The lower portions 25 of the frame front are hinged or pivoted about the stud 17, and can swing downwardly independently to release the proximate lens 26 which is fitted in a groove 27 in the top frame portion 14 and a similar groove 28 in the swinging portion 25. The latter may be caught when closed by a mere catch such as 30 but I prefer that the guard 21 shall engage the swinging portion 25 near its free end and thus form an absolute lock yet permitting quick and easy detachment merely by pressing together two guards 21 and removing them with their connecting spring 22 which rests in the groove 23, thus freeing the locked ends of the two swinging portions, now only held by the catches 30.

While I prefer that the lower portions of the frame front 11 be movable, I may hinge the top portions as shown in Figure 3. The top portions 33 being hinged near each side pivot of the temple and having a catch 34 near the bridge. In this modification the harlequin shape is shown and it will be noted that the temples, the bridge and the lower portion of the framework are all in one piece. While not nearly as satisfactory as the preferred form, this modification will indicate changes that may be made in any of the forms of the invention.

In Figure 4 the bridge portion is divided by a line or margin 37 and here again the temples and the lower portion of the frame are all in one piece but the top portion 38 of the frame front can be swung about the pivot 39 and may have at the other side a slot connection 40 to engage the other temple pivot stud. The portion 38 is preferably quite resilient and this forms a rather firm and close joint along the line 37.

In Figure 5 the frame front is slotted as shown at 43 and consequently only the central free portion 44 of the frame swings about the pivot. This modification can be used in connection with any of the other figures, for example in Figure 1, the portion 25 which is hinged at 17 would be merely ⅓ the thickness of the frame. In other words, the entire swinging piece would need only be the thickness of the tongue 46 of the swinging portion 25 which in this modification could be arcuate. Since lenses are almost invariably convex the slotted feature could not be used with normal fashion glasses but would have its principal field of usefulness with glasses intended for industrial use wherein the mere swinging of the two pivoted portions would allow the removal of the plane glass through the slot 43 after which the closure 44 could be caught either by the simple catch or preferably by the catch locked in place by the spring and guard combination.

What I claim is:

1. In combination, a mounting having a pair of main rim portions, a bridge grooved in its lower portion and connecting said main rim portions, a lower rim portion hinged to each main rim portion to hold a lens in the mounting, a retaining member having two spring ends engaging the free ends of the two lower rim portions to hold the ends in closed position when the retaining member is expanded into the groove of the bridge, whereby the lenses are held against displacement until the two ends of the retaining member are pressed together against their outward urge, to release one or both of the hinged lower portions.

2. The device of claim 1 in which a nose guard is attached to each end of the retaining member.

3. The device of claim 1 in which the main rim portions are each slotted at the bottom thereof to receive thru the slot a lens, and the hinged lower rim portions move into engagement with the lenses when so inserted to hold the lenses in place.

SHIRLEY W. MARKS.

REFERENCES CITED

The following references are of record in the file of this patent:

UNITED STATES PATENTS

| Number | Name | Date |
|---|---|---|
| 631,533 | Squier | Aug. 22, 1899 |
| 1,805,529 | Nelson | May 19, 1931 |
| 1,988,646 | Dirr | Jan. 22, 1935 |
| 2,362,002 | Gluck | Nov. 7, 1944 |
| 2,444,498 | Cochran | July 6, 1948 |

FOREIGN PATENTS

| Number | Country | Date |
|---|---|---|
| 209,325 | Germany | Apr. 29, 1909 |
| 103,256 | Switzerland | Feb. 1, 1924 |
| 433,650 | Great Britain | Aug. 19, 1935 |